United States Patent Office 2,886,454
Patented May 12, 1959

2,886,454

PROCESS FOR THE MANUFACTURE OF METALLIC CARBIDES

Hoyt H. Todd, Whittier, Calif., assignor to Western Carbide Corporation, North Hollywood, Calif., a corporation of California No Drawing. Application September 30, 1955
Serial No. 537,882

12 Claims. (Cl. 106—43)

This invention relates to the production of metallic carbides and is particularly directed to the production by exothermic reaction, of refractory and hard carbides of the transition metals of the fourth, fifth, and sixth groups of the periodic system. These transition metals include titanium, zirconium, and hafnium of the fourth group; vanadium, columbium, and tantalum of the fifth group; chromium, molybdenum, and tungsten of the sixth group.

While the invention may be variously applied for various specific purposes, the initial practice of the invention is directed to the problem of producing carbides suitable for use as hardfacing materials, abrasives and refractory materials. It is contemplated that the carbides will be suitable for hardfacing metals both by arc welding techniques and by gas welding techniques. For these purposes welding rods may be employed comprising metal tubes filled with carbides that are produced in accord with the teachings of the invention. Such carbides must be relatively hard and have relatively high melting points. They should contain relatively little dissolved aluminum. The carbides should have a greater density than iron to sink into molten iron and steel and should be of such character as to form a good matrix in the weld puddle.

The purpose of an arc welding technique, for example, may be to produce a hard wear resistant surface containing complex carbides within the matrix, of the order of 1200 K 100 hardness. The present invention provides complex carbides of this hardness and greater hardness. Such a surface has special utility for withstanding severe abrasion. It is possible to produce a smooth homogeneous surface because the temperature of an arc is high enough to melt the carbide particles.

The purpose of a gas weld welding technique may be, for example, to produce a hard facing comprising numerous hard carbide particles in a relatively soft matrix. The carbide particles should have a hardness of the range of 1200 K 100 to 2100 K 100, and, of course, must have a melting point of the order of 4000° F. or higher to survive the temperature of an oxy-acetylene flame.

In present conventional methods of manufacturing metallic carbides in massive form, the initial material consists of metal powder, which is melted to form a pool of molten metal in preparation for the addition of the carbon. There has been a long standing need for an exothermic process for the production of such carbides, since such a process eliminates the need for an expensive furnace together with an adequate outside power source, and also eliminates the need for expensive crucibles. An exothermic process would combine in one operation the steps of reduction of the metal oxides, the melting of the metal and the addition of the carbon. In spite of these widely known advantages, however, no such exothermic process has been heretofore developed within my knowledge, the reason being that certain exceedingly troublesome problems and limitations are encountered in any attempt to produce metal carbides of acceptable properties by exothermic procedures.

For such an exothermic process to be successful, it must produce a sufficiently high temperature to result in the formation of a carbide mass, it being necessary that the temperature exceed the melting point of the carbide product by several hundred degrees. It has been found that most mixtures of metal oxides, aluminum and carbon that would occur to a person skilled in the art fail completely to produce a carbide mass, and more often than not, when such a mixture is repeatedly varied until finally a mass is produced, the mass contains too much aluminum in addition to the metal carbides or for some other reason lacks the properties required in a product for the present purposes. One difficulty in attempting to theorize as to whether or not a particular mixture will be operative is that the product is a complex of compounds that do not reveal ordinary valence relationships. Another difficulty is that the attainable temperature is reduced by heat losses arising from such causes as the escape of carbon monoxide and the evaporation of ingredients of the mixture. These losses are difficult to estimate. A further complication is that some of the carbon, as well as the aluminum, reduces the metal oxide, and the reducing action by the carbon lowers the attainable temperature. In the first place, the reduction of an oxide by the carbon results in the generation of less heat than can be produced by the reduction of the oxide by aluminum; and, in the second place, there is substantial heat loss involved in the escape of the resulting carbon monoxide. Finally, there is always some evaporation of the aluminum with further consequent heat loss.

In general it may be stated that the temperature of the reaction is as follows:

$$T = \frac{\text{Total heat generated}}{\text{Specific heat of products} \times \text{wt. of products}}$$

This formula may serve as a rough guide in devising an initial mixture for a series of experiments, but cannot be relied upon to foretell results because of the above mentioned numerous factors that lower the temperature. The formula, however, is useful for eliminating in advance mixtures that are inherently incapable of producing an operative temperature.

The present invention affords various solutions to the problem of obtaining an operative temperature which solutions are represented by various successful mixtures disclosed herein. In general, the approach to the problem is to use the above formula to eliminate unpromising mixtures and to seek a high reaction temperature, while at the same time taking steps to minimize factors that reduce the temperature of the reaction. In some practices of the invention, oxygen gas may be fed to the reaction, if desired, to help to raise the temperature to an operative level.

When the melting point of a desired carbide produced by using a selected carbide is above the potential temperature of the exothermic reaction with or without the addition of oxygen, one or more other oxides may be added, the added oxide or oxides being capable of forming carbides of nature similar to the desired carbide. In this manner the newly formed carbides alloy with the more refractory carbides, such as tungsten carbide and vanadium carbide, to form a complex carbide having a melting point below the temperature afforded by the reaction and thus result in the collection of a carbide mixture in massive form in the bottom of the crucible.

A second general problem to be met in the practice of the invention is to minimize the presence of aluminum in the final product. The presence of too much aluminum has an undesirable effect in altering the properties of the product, and, moreover, a carbide obtaining over a few percent of aluminum cannot be welded by an oxy-acetylene flame because aluminum oxide forms to prevent the carbide from being wetted by the molten weld puddle.

It has been found that if the theoretical quantity of aluminum is used in conjunction with the carbon, too much of the aluminum enters the final product. It is necessary, therefore, to use less than the theoretical quantity of aluminum, usually about 10% to 20% less.

It so happens, however, that in some instances merely reducing the proportionate amount of aluminum or, conversely, increasing the proportionate amount of the metal oxide does not prevent excessive aluminum in the product. Tungsten carbide mixtures and molybdenum carbide mixture are examples to which the statement of the preceding sentence applies. Apparently, the explanation is found in the fact that the oxides of these particular metals are volatile. I have solved this further problem, however, by adding an oxide of a suitable metal. I have found that chronic oxide may be added to such a mixture to result in an acidic slag that will be oxidizing with respect to aluminum and aluminum carbide, but will not be oxidizing with respect to tungsten or molybdenum. During the reduction of such a mixture of oxides by a carbon-aluminum mixture, the more anodic elements are the last to be reduced. Thus molybdenum oxide is reduced before tungsten oxide in the same mixture; tungsten oxide is reduced before chromium oxide in the same mixture; and chromium oxide is reduced before vanadium oxide.

I have found that silicon in elemental form can replace part of the aluminum, say up to 20%. In most instances the addition of silicon is desirable to retard the rate of oxidation and silicon is further desirable because it produces an acidic slag. Moreover, silicon in the form of $SiO_2$ can be used to retard the rate of oxidation and give an acidic slag. However, $SiO_2$ replaces no part of the aluminum powder.

To carry out my process I add carbon and aluminum powder to one or more of the oxides of the selected metals and ignite the mixture to initiate an exothermic reaction. As heretofore indicated, while the reduction of the oxide to the carbide is performed primarily by the aluminum powder as well as by silicon when silicon is present, it is also performed to a considerable extent by the carbon. Thus the carbon has the dual function of reducing the metal oxide and of entering into combination with the reduced metal to form the ultimate carbide. The fact that the carbon does aid in the reduction is indicated by the presence of a flame that burns above the crucible during the reaction and is also indicated by the streamers of soot which form as a result of incomplete combustion of the carbon monoxide above the crucible. Such carbon as is not oxidized during the reduction process and does not enter into a carbide becomes dissolved in the metal or is held in the slag. Since a portion of the carbon is oxidized and a portion goes into the slag, an excess of carbon above that theoretically required must be added to the mixture to result in the desired carbide product. The amount of this excess will depend to some extent on the mesh size of the aluminum powder and the mesh size of the carbon. The coarser the mesh size of the aluminum with respect to that of the carbon, the greater the amount of carbon that will be oxidized during the reaction. I have found that the amount of carbon that is used in the mixture should not exceed 15% to 20% of the theoretical weight of the metal in the oxides of the transition metals used in the mix and ordinarily should be on the order of 5 to 20% or less.

I have further found that the density of the carbon used in the mixture should ordinarily exceed 2.0, since otherwise the necessary weight of carbon occupies such a large percentage of the volume of the mixture as to prevent proper combustion. Carbon of relatively high density, for example, graphite, is easily wet and absorbed by the liquid metal. Flake graphite of high purity and the particle size range of −60, +150 mesh U.S. Standard has been found to give the best carbon absorption. Mesh sizes smaller than this tend to be oxidized excessively during the reduction and also tend to be carried out of the crucible by the stream of gas. Coarser mesh sizes, on the other hand, do not present enough surface area of carbon to the metal for proper carbon absorption.

To avoid excessive brittleness and to prevent the formation of coarse granular crystalline structures, the carbide mixtures must be such that the respective carbides are mutually soluble in each other over a wide composition range. The following combinations in the following percentage ranges are examples: tungsten-chromium carbides ranging from 80% tungsten carbide and 20% chromium carbide to the opposite extreme at which substantially all the carbide is chromium carbide; molybdenum-tungsten carbides ranging from 50% tungsten carbide and 50% molybdenum carbide to the extreme at which the carbide is substantially entirely molybdenum carbide; molybdenum-chromium carbides ranging from nearly 100% molybdenum carbide to nearly 100% chromium carbide; vanadium-molybdenum carbides ranging from nearly 100% vanadium carbide to nearly 100% molybdenum carbide; and vanadium-chromium carbides ranging from nearly 100% vanadium carbide to nearly 100% chromium carbide. Other combinations are possible, including combinations comprising more than two carbides. The carbon percentage in each of these combinations must be sufficient to form the carbide of the lowest carbide percentage possible in such a mixture since otherwise free metal will exist in the carbide product. The carbon will never exceed 10 to 20% of the theoretical weight of the metal in the oxides of the transition metals used in the mix.

The aluminum powder used in combination with the carbon is preferably within the particle size range of from −30 to +60 mesh U.S. Standard. Some fine aluminum powder such as −400 mesh may be added to accelerate the reaction, but such fine powder must not be used exclusively or the reaction will be of explosive violence. The addition of the silicon in elemental form is useful as further precaution against such explosive action. When $SiO_2$ is included it may amount to 15 to 30% of the theoretical weight of the metal in the oxides of the transition metals in the mix.

An example of a mixture that will produce a carbide composition suitable for hardfacing metal by a gas flame technique is as follows:

| | |
|---|---|
| $MoO_3$ | 75 parts by weight (−60 mesh). |
| $WO_3$ | 50 parts by weight (−60 mesh). |
| $V_2O_5$ | 20 parts by weight (−10 mesh). |
| $CrO_3$ | 15 parts by weight (−10 mesh). |
| $SiO_2$ | 10 parts by weight (−60 mesh). |
| Graphite | 12 parts by weight (−100 mesh). |
| Aluminum | 45 parts by weight (−30, +60 mesh). |

The above ingredients are weighed out and mixed together by tumbling and then are placed in a crucible and ignited in such a manner that burning progresses from the bottom of the crucible to the top. If, on the contrary, the mixture is ignited from the top to progress downward a layer of liquid metal collects on top of the unburned portion of the mixture and in the course of the reaction the aluminum oxide and slag passes upward through the metal pool. When the descending liquid metal reaches the cold bottom of the crucible, however, it freezes almost instantaneously to trap the slag that is currently moving upward through the metal. But no such upward movement of the slag through the metal occurs when the mixture is ignited from the bottom.

Burning can be initiated from the bottom by putting a combustible mixture of sodium and barium peroxide together with the previously mentioned aluminum on the bottom of the crucible, igniting this mixture and then dumping the carbide-forming materials on top. The peroxide particles may be of −40 mesh size and sufficient peroxide is used to consume the aluminum mixed therewith. Another procedure for igniting the mixture from the bottom is carried out by using a crucible with an ignition hole in the side near the bottom. The ignition mixture is placed on the bottom under the carbide-forming mixture and is ignited through the ignition hole, for example, by inserting a redhot metal rod through the ignition hole. An efficient ignition mixture, for example, comprises equal parts by weight of sodium peroxide and aluminum at room temperature, the particle size of which may be —40 mesh.

Zirconium oxide or silicon oxide tubes directed into the bottom of the crucible, may be used for this purpose.

In the course of the reaction a portion of the tungsten and molybdenum oxides are lost from the crucible by evaporation, but the losses may be recovered by means of a suitable dust recovery system. After the reaction is completed, the resulting material is permitted to cool to room temperature, no attempt being made to control the cooling rate, and the resultant carbide button along with the slag is removed from the crucible. The slag is broken away from the carbide button and then the carbide button is crushed and screened to various mesh sizes, for example, —20 +30, —30 +40, and —40 +60. Finally the screened carbides may be loaded in steel tubes for use in gas welding and arc welding techniques.

Relatively little of the chromium enters the final complex carbide product. The molybdenum is essential for the attainment of a high temperature and a relatively low melting point to make the mixture successful. The vanadium accounts for the exceptionally high degree of hardness. The tungsten contributes both hardness and density. Oxides of vanadium and titanium may also be used for the same purpose as chromium oxide.

The complex carbide product produced by this first example has nearly the same qualities as tungsten carbide, but may be produced at approximately half the cost or less. The hardness of the product is on the order of 1800 K 100 to 2100 K 100 and the melting point is higher than 4000° F. This carbide composition will survive the temperature of an oxy-acetylene flame and when used in mild steel tubes for application by a gas flame technique results in a hardfacing in which exceedingly hard particles are embedded in a softer metal matrix.

The proportions used in this first example may be varied.

Another example of an operative mixture is as follows:

$V_2O_5$ _____ 120 parts by weight (—10 mesh).
$CrO_3$ _____ 77 parts by weight (—10 mesh).
Aluminum _____ 95 parts by weight (—30, +60 mesh).
Graphite _____ 25 parts by weight (—100 mesh).
$SiO_2$ _____ 50 parts by weight (—60 mesh).

In this second example, unlike the first example, the primary purpose of the chromic oxide is to produce chromium carbide in the final complex carbide product, the chromium carbide being combined with vanadium carbide. The hardness of the carbide product is at least 1200 K 100. When this product is packed into mild metal tubes for application by an electric arc technique, the arc melts the carbide to produce a more or less homogeneous hardfacing that is highly desirable for some purposes.

A third example of an operative mixture is as follows:

$WO_3$ _____ 100 parts by weight (—60 mesh).
$CrO_3$ _____ 38 parts by weight (—60 mesh).
Aluminum ___ 35 parts by weight (—30, +60 mesh).
Graphite _____ 18 parts by weight (—60 mesh, +150 mesh).

In this example, as in the first example, the chromic oxide serves, at least in part, to make the slag acidic.

The product has desirable properties much like the product of the first example.

My description in detail of selected practices of the invention by way of example and to illustrate the principles involved will suggest various changes, substitutions and other departures from my disclosure that properly lie within the spirit and scope of the appended claims.

I claim:

1. A method of producing a carbide composition by an exothermic reaction which includes the steps of: mixing finely divided carbon and powdered aluminum with at least one oxide of a metal selected from a group consisting of tungsten, molybdenum, vanadium, and chromium; and igniting the mixture, the amount of carbon being 5 to 20% of the theoretical weight of the metals in the oxides of the selected metals.

2. A method as set forth in claim 1 which includes the step of supplying oxygen to the reaction from an outside source.

3. A method as set forth in claim 1 which includes the step of adding silicon in elemental form to the mixture with corresponding reduction in the amount of aluminum, the silicon replacing up to 20% of the aluminum.

4. A method as set forth in claim 1 which includes the addition of $SiO_2$ in an amount comprising from 15 to 30% of the theoretical weight of the metals in the oxides of the selected metals in the mixture.

5. A method as set forth in claim 1 in which the density of the carbon exceeds 2.0.

6. A method as set forth in claim 5 in which the carbon comprises 5 to 15% of the theoretical weight of the metals in the oxides of the selected metals in the mixture.

7. A method as set forth in claim 1 in which the mixture includes oxides of two of the metals, one of which metals is chromium.

8. A method as set forth in claim 7 which includes oxides of all four of the metals of the group.

9. A method as set forth in claim 8 in which the major portion of the oxides of the metals of the group comprises oxides of molybdenum and tungsten.

10. A method as set forth in claim 3 in which the mixture includes $MoO_3$, $WO_3$, $V_2O_5$, $CrO_3$, $SiO_2$, carbon and aluminum, the amount of $SiO_2$ comprising 15 to 30% of the theoretical weight of the selected metals in the mixture.

11. A method as set forth in claim 3 in which the mixture essentially consists of $V_2O_5$ $CrO_3$, $SiO_2$, carbon and aluminum, the amount of $SiO_2$ comprising 15 to 30% of the theoretical weight of the selected metals in the mixture.

12. A method as set forth in claim 1 in which the mixture consists essentially of $WO_3$, $CrO_3$, carbon and aluminum.

References Cited in the file of this patent

UNITED STATES PATENTS

| | | |
|---|---|---|
| 2,124,509 | McKenna | July 19, 1938 |
| 2,170,432 | Schwargkopf | Aug. 22, 1939 |
| 2,349,052 | Ollier | May 16, 1944 |

FOREIGN PATENTS

| | | |
|---|---|---|
| 478016 | Great Britain | Jan. 11, 1938 |

OTHER REFERENCES

Hackh's Chemical Dictionary 3rd Edition (1944) pages 282–283.